(No Model.)
T. F. KRUEGER.
PIPE WRENCH.
No. 379,519. Patented Mar. 13, 1888.
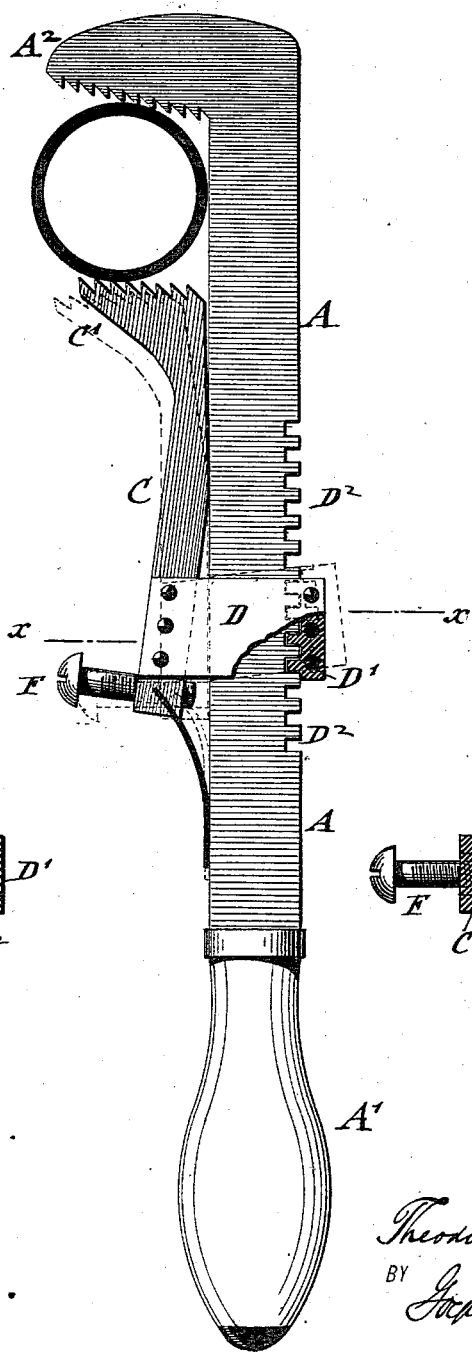
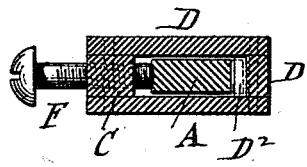
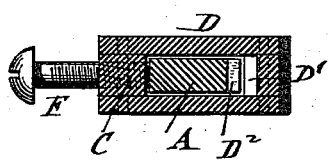
WITNESSES:
INVENTOR.
Theodore F. Krueger.
BY
ATTORNEYS.

UNITED STATES PATENT OFFICE.

THEODORE F. KRUEGER, OF NEW YORK, N. Y.

PIPE-WRENCH.

SPECIFICATION forming part of Letters Patent No. 379,519, dated March 13, 1888.

Application filed June 16, 1887. Serial No. 241,469. (No model.)

*To all whom it may concern:*

Be it known that I, THEODORE F. KRUEGER, of the city, county, and State of New York, have invented certain new and useful Improvements in Pipe-Wrenches, of which the following is a specification.

This invention relates to an improved pipe-wrench which can be readily adjusted to any size of pipe and which takes hold of the same with a firm grip, but instantly releases the pipe when the wrench is to be detached; and the invention consists of a pipe-wrench comprising a stationary jaw having a main shank provided with a straight side and a rack at the opposite side, a movable jaw, the shank of which has an obtuse-angled face next to the straight side of the main shank and is rigidly applied to a guide-box, said guide-box embracing the main shank and being provided with an interiorly-toothed section that engages the rack of the main shank, while the opposite end of the guide-box carries a spring, the free end of which presses against the main shank. A thumb-screw is arranged at the lower end of the movable shank, and serves, when screwed forward, to lock the toothed end section of the guide-box into the rack of the main shank whenever the jaws are to be rigidly set at a certain distance from each other.

In the accompanying drawings, Figure 1 represents a side elevation of my improved pipe-wrench with a part broken away, and Figs. 2 and 3 are horizontal sections on line $x\,x$, Fig. 1, showing the guide-box and its toothed section, respectively, as locked to the toothed main shank and as released therefrom.

Similar letters of reference indicate corresponding parts.

In the drawings, A represents the main shank, which is provided at one end with a handle, A', and at the opposite end with a stationary jaw, $A^2$. A movable shank, C, is guided alongside of the main shank A by a guide-box, D, and provided at the upper end with a jaw, C'. The face of the shank C adjoining the main shank A is made in the shape of an obtuse angle, the lower part of the shank C' being riveted or otherwise rigidly attached to the guide-box D. The guide-box D extends around the main shank and is provided at the side opposite to the movable shank C with an interiorly-toothed wall or section, D', which engages a rack, $D^2$, on the same side of the main shank as the toothed section D' of the guide-box D. The movable shank C is extended below the guide-box D and provided with a spring, E, the free end of which presses on the main shank and moves along the same, as shown in Fig. 1.

The spring E serves to move the end of the movable shank C away from the main shank A, and keep thereby the toothed section D' of the box D in mesh with the rack $D^2$ of the main shank A. In the lower projecting end of the shank C of the movable jaw C' is further arranged a thumb-screw, F, so that by pressing on the head of the thumb-screw the shank C of the movable jaw C' is moved toward the main shank A against the tension of the spring E, and releases thereby the toothed section D' from the rack $D^2$, as shown in dotted lines in Fig. 1, so as to permit the adjustment of the guide-box D and of the movable jaw C' on the main shank A toward or away from the stationary jaw B, whereby the jaws $A^2$ and C' are readily applied to grip any size of pipe.

The lower free end of the spring E slides along the straight side of the main shank A while the adjustment of the movable shank C in either direction takes place. By the angular shape of the shank of the movable jaw the upper part of the shank is pressed firmly against the main shank when the pipe is gripped by the jaws, while when the grip is released the lower part of the shank is pressed against the main shank, and produces thereby the interlocking of the toothed section of the guide-box with the rack of the main shank, or the release of the same.

Whenever it is desired to work the wrench so as to grasp pipes of uniform thickness, or whenever it is desired to retain the jaws rigidly in position after they have been adjusted, the thumb-screw E is turned and screwed forward in the shank C, so that it abuts against the main shank A and prevents thereby the release of the toothed section D' from the rack $D^2$, as shown in Fig. 2. The wrench can in this position be used for one size of pipe, the guide-box being rigidly locked to the main shank and prevented from clearing the rack even if pressure be exerted on the thumb-screw. This is an important feature of my wrench, as thereby the slipping of the jaws or the accidental releasing of the guide-box while the same is manipulated can be entirely avoided. Another important point is, that the jaws are instantly released from the pipe when the wrench is moved away from the pipe, as owing to the spring acting on the shank of the movable jaw the latter releases instantly its grip on the pipe.

Having thus described my invention, I claim as new and desire to secure by Letters Patent—

1. The combination of a main shank having a stationary jaw at the outer end, a straight side and a rack at the opposite side, a movable jaw having a shank with an obtuse-angled face next to the straight side of the main shank, a guide-box applied rigidly to the shank of the movable jaw and provided with a toothed end wall or section for engaging the rack of the main shank, and a spring that is attached to the lower end of the shank of the movable jaw and adapted to slide by its free end along the main shank, substantially as set forth.

2. The combination of a main shank having a stationary jaw at the outer end, a straight side and a rack at the opposite side, a movable jaw having a shank with an obtuse-angled face next to the straight side of the main shank, a guide-box attached rigidly to the lower end of the movable jaw, said guide-box having a toothed section meshing with the rack of the main shank, a spring secured to the lower end of the shank of the movable jaw, the free end of the spring sliding along the main shank, and a locking-screw passing through the lower end of the movable shank, substantially as set forth.

In testimony that I claim the foregoing as my invention I have signed my name in presence of two subscribing witnesses.

THEODORE F. KRUEGER.

Witnesses:
PAUL GOEPEL,
MARTIN PETRY.